(12) United States Patent
Yeh (10) Patent No.: US 10,908,930 B2
(45) Date of Patent: Feb. 2, 2021

(54) HYBRID INTERACTIVITY IN JAVASCRIPT WEBPAGE USER INTERFACES

(71) Applicant: Walmart Apollo, LLC, Bentonville, AR (US)

(72) Inventor: Roger Yeh, Woodland, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 15 days.

(21) Appl. No.: 16/265,467

(22) Filed: Feb. 1, 2019

(65) Prior Publication Data

US 2020/0249963 A1    Aug. 6, 2020

(51) Int. Cl.
*G06F 17/00* (2019.01)
*G06F 9/451* (2018.01)
(Continued)

(52) U.S. Cl.
CPC ............ *G06F 9/451* (2018.02); *G06F 3/0482* (2013.01); *G06F 16/986* (2019.01); *G06F 40/14* (2020.01); *H04L 67/02* (2013.01)

(58) Field of Classification Search
CPC ........ G06F 9/451; G06F 40/14; G06F 16/986; G06F 3/0482; G06F 40/143; H04L 67/02
See application file for complete search history.

(56) References Cited

U.S. PATENT DOCUMENTS

| 7,921,353 B1 * | 4/2011 | Murray | G06F 16/972 715/200 |
| 2006/0101444 A1 * | 5/2006 | Pepin | G06F 8/24 717/165 |

(Continued)

OTHER PUBLICATIONS

So, Decoupled Drupal in Practice, 2018, Ch. 3, p. 21-28 (Year: 2018).*
Hakim, Speed Index and Critical Path Rendering, 2016, Winona Research Seminar, p. 41-46 (Year: 2016).*
Wikipedia, "Ajax (programming)," https://en.wikipedia.org/wiki/Ajax_(programming), accessed Jan. 30, 2019.

(Continued)

*Primary Examiner* — Andrew T McIntosh
(74) *Attorney, Agent, or Firm* — Bryan Cave Leighton Paisner LLP (57) ABSTRACT

A method including receiving, at a web server, a first request from a client device to access a webpage. The method also can include downloading HTML elements and CSS elements of the webpage from the web server to the client device such that a web browser of the client device renders visible page content associated with the HTML elements and the CSS elements of the webpage. The method additionally can include downloading a first JavaScript file from the web server to the client device such that a first group of interactive user interface modules of the webpage are rendered by the client device using the first JavaScript file. The first group of interactive user interface modules can provide client-side interactive rendering of the webpage. The first JavaScript file can be a frameworkless JavaScript file. The method further can include downloading a second JavaScript file from the web server to the client device for a second group of interactive user interface modules. The second JavaScript file can be a framework-based JavaScript file for an isomorphic JavaScript framework. The second group of interactive user interface modules can be rendered at both the client device and the web server using the isomorphic JavaScript framework. Other embodiments are disclosed.

20 Claims, 6 Drawing Sheets

(51) Int. Cl.
*G06F 16/958* (2019.01)
*G06F 3/0482* (2013.01)
*G06F 40/14* (2020.01)
*H04L 29/08* (2006.01)

(56) References Cited

U.S. PATENT DOCUMENTS

| | | | |
|---|---|---|---|
| 2012/0191577 A1* | 7/2012 | Gonsalves | G06Q 30/06 705/27.2 |
| 2012/0290911 A1 | 11/2012 | Zhao | |
| 2018/0121044 A1* | 5/2018 | Watkins | G06F 8/315 |
| 2018/0210714 A1 | 7/2018 | Grigoryan et al. | |
| 2018/0210715 A1 | 7/2018 | Grigoryan et al. | |
| 2018/0210866 A1 | 7/2018 | Grigoryan et al. | |
| 2018/0210965 A1 | 7/2018 | Grigoryan et al. | |

OTHER PUBLICATIONS

Wikipedia, "Document Object Model," https://en.wikipedia.org/wiki/Document_Object_Model, accessed Jan. 30, 2019.

Wikipedia, "JavaScript," https://en.wikipedia.org/wiki/JavaScript, accessed Jan. 30, 2019.

Wikipedia, "Node.js," https://en.wikipedia.org/wiki/Node.js, accessed Jan. 30, 2019.

React, "A JavaScript library for building user interfaces," https://reactjs.org/, accessed Jan. 30, 2019.

Wikipedia, "React (JavaScript library)," https://en.wikipedia.org/wiki/React_(JavaScript_library), accessed Jan. 30, 2019.

React, "ReactDOM," https://reactjs.org/docs/react-dom.html, accessed Jan. 30, 2019.

Electrode, "Server Side Data Hydration," https://docs.electrode.io/guides/general/server-side-data-hydration, accessed Jan. 30, 2019.

Mardan, Azat, "Why Everyone is Talking About Isomorphic / Universal JavaScript and Why it Matters," https://medium.com/capital-one-tech/why-everyone-is-talking-about-isomorphic-universal-javascript-and why-it-matters-38c07c87905, Mar. 21, 2016.

Snipcart, "You SHOULD Learn Vanilla JavaScript Before JS Frameworks," https://snipcart.com/blog/learn-vanilla-javascript-before-using-js-frameworks, accessed Jan. 30, 2019.

* cited by examiner

United States Patent

HYBRID INTERACTIVITY IN JAVASCRIPT WEBPAGE USER INTERFACES

TECHNICAL FIELD

This disclosure relates generally to webpage user interfaces and more specifically to providing hybrid interactivity in JavaScript webpage user interfaces.

BACKGROUND

JavaScript has become a primary technology in webpage development that adds user interactivity to HTML (Hypertext Markup Language) webpages. In recent years, server-side JavaScript implementations have been introduced. Additionally, JavaScript frameworks have been introduced that use "isomorphic" JavaScript (sometimes referred to as "universal" JavaScript), which allow developers to create webpages that render on both the server side and the client side. Isomorphic JavaScript can allow for code re-use and consistency on both the server side and the client side and for interactive webpages to be indexed by search engine web crawlers, such that interactive webpages can be included in search engine optimization.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments can include a system including one or more processors and one or more non-transitory computer-readable media storing computing instructions configured to run on the one more processors and perform certain acts. The acts can include receiving, at a web server, a first request from a client device to access a webpage. The acts also can include downloading HTML elements and CSS elements of the webpage from the web server to the client device such that a web browser of the client device renders visible page content associated with the HTML elements and the CSS elements of the webpage. The acts additionally can include downloading a first JavaScript file from the web server to the client device such that a first group of interactive user interface modules of the webpage are rendered by the client device using the first JavaScript file. The first group of interactive user interface modules can provide client-side interactive rendering of the webpage. The first JavaScript file can be a frameworkless JavaScript file. The acts further can include downloading a second JavaScript file from the web server to the client device for a second group of interactive user interface modules. The second JavaScript file can be a framework-based JavaScript file for an isomorphic JavaScript framework. The second group of interactive user interface modules can be rendered at both the client device and the web server using the isomorphic JavaScript framework.

A number of embodiments can include a method being implemented via execution of computing instructions configured to run at one or more processors and stored at one or more non-transitory computer-readable media. The method can include receiving, at a web server, a first request from a client device to access a webpage. The method also can include downloading HTML elements and CSS elements of the webpage from the web server to the client device such that a web browser of the client device renders visible page content associated with the HTML elements and the CSS elements of the webpage. The method additionally can include downloading a first JavaScript file from the web server to the client device such that a first group of interactive user interface modules of the webpage are rendered by the client device using the first JavaScript file. The first group of interactive user interface modules can provide client-side interactive rendering of the webpage. The first JavaScript file can be a frameworkless JavaScript file. The method further can include downloading a second JavaScript file from the web server to the client device for a second group of interactive user interface modules. The second JavaScript file can be a framework-based JavaScript file for an isomorphic JavaScript framework. The second group of interactive user interface modules can be rendered at both the client device and the web server using the isomorphic JavaScript framework.

Figure 1:
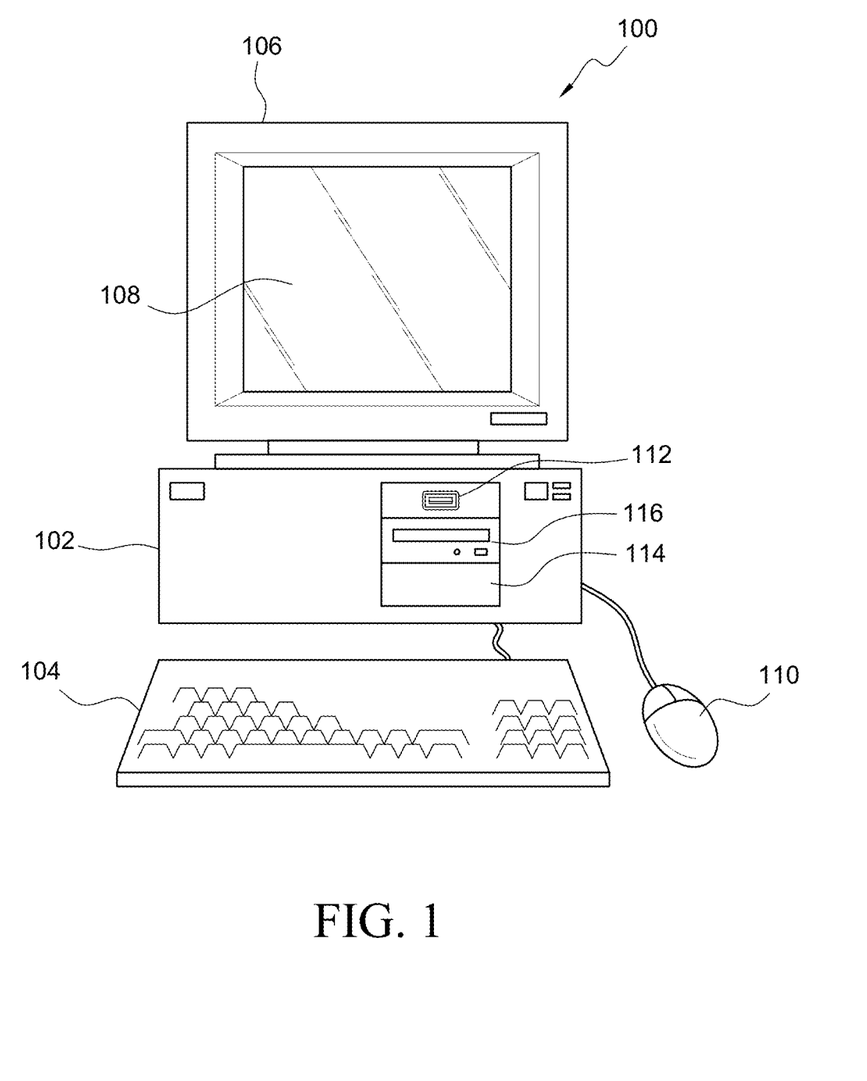
FIG. 1 illustrates a front elevational view of a computer system that is suitable for implementing an embodiment of the system disclosed in FIG. 3.
Figure 2:
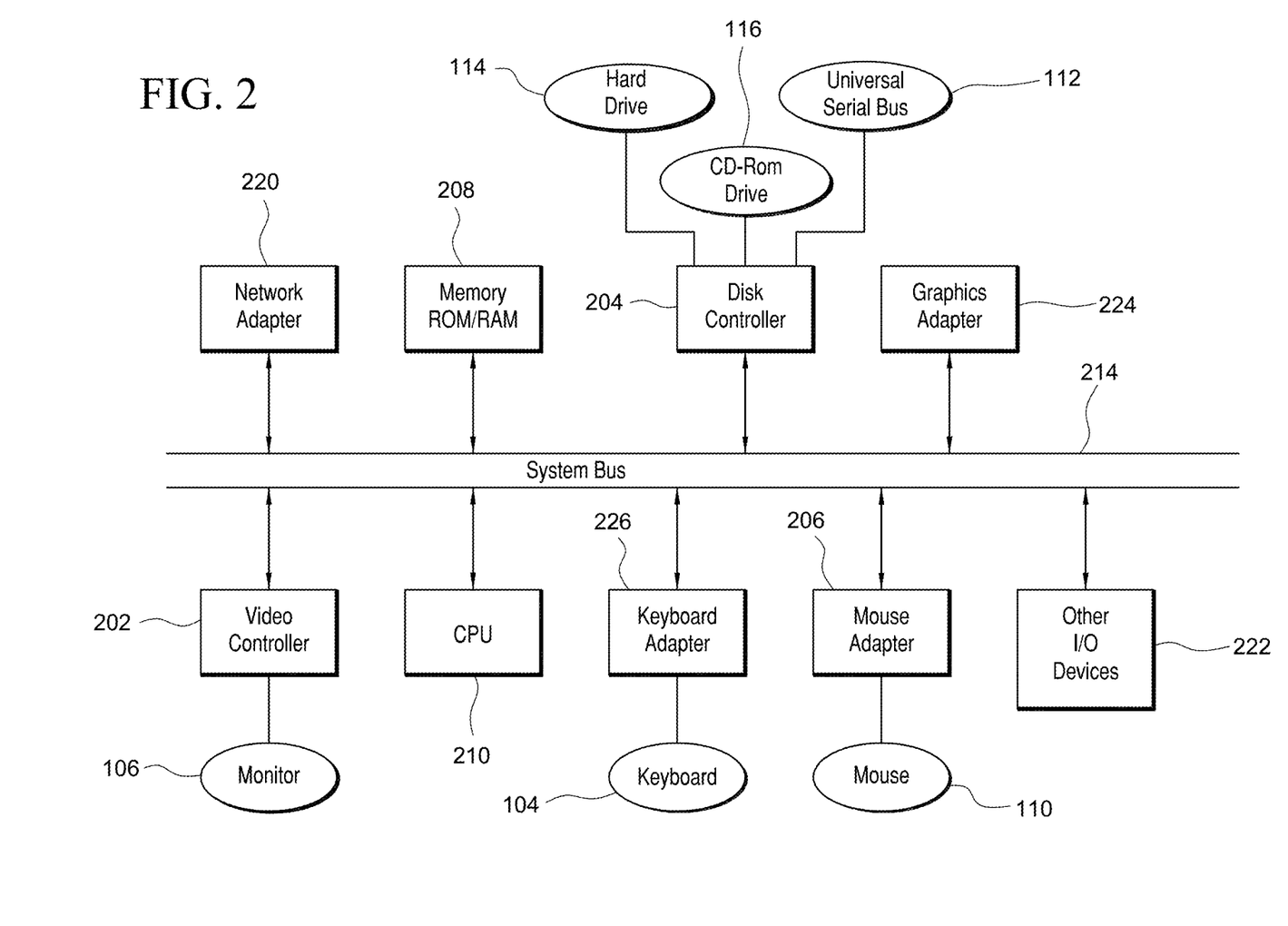
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
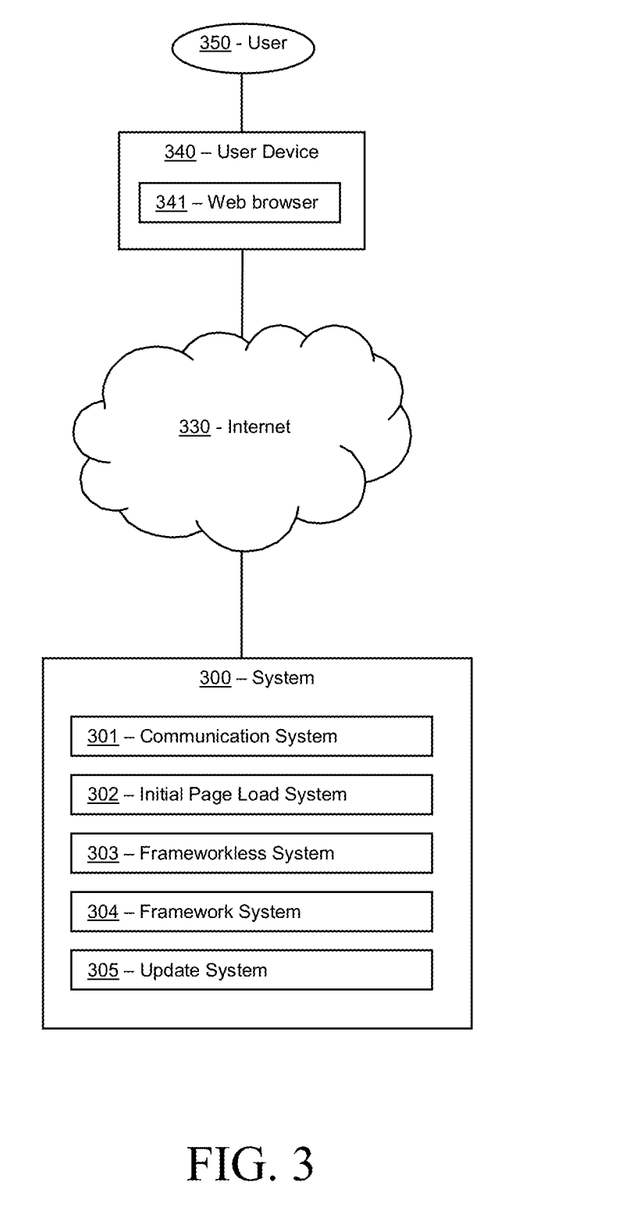
FIG. 3 illustrates a block diagram of a system for hybrid interactivity in JavaScript webpage user interfaces, according to an embodiment.

Turning ahead in the drawings, FIG. 3 illustrates a block diagram of a system 300 that can be employed for hybrid interactivity in JavaScript webpage user interfaces, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can be in data communication through Internet 330 with one or more user devices, such as a user device 340. In some embodiments, user device 340 can be used by users, such as a user 350. In many embodiments, system 300 can host one or more websites and/or mobile application servers. For example, system 300 can host a website, or provide a server that interfaces with a mobile application, on user device 340, which can allow users to browse and/or search for items (e.g., products), to add items to an electronic cart, and/or to purchase items, in addition to other suitable activities. In many embodiments, user device 340 can include a web browser 341, which can be used to display webpages from the website hosted by system 300. For example, the web browser can Google Chrome, Firefox, Internet Explorer, Opera, Safari, Microsoft Edge, or another suitable web browser. In many embodiments, the web browser can include a JavaScript engine.

In some embodiments, system 300 (and/or the software used by system 300) can refer to a front end system, as is can be accessed and/or used by one or more users, such as user 350, using user computer 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea.

Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300 and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 300 can include a communication system 301, an initial page load system 302, a frameworkless system 303, a framework system 304, and/or an update system 305. In many embodiments, the systems of system 300 can be modules of computing instructions (e.g., software modules) stored at non-transitory computer readable media that operate on one or more processors. In other embodiments, the systems of system 300 can be implemented in hardware. System 300 can be a computer system, such as computer system 100 (FIG. 1), as described above, and can be a single computer, a single server, or a cluster or collection of computers or servers, or a cloud of computers or servers. In another embodiment, a single computer system can host system 300. Additional details regarding system 300 and the components thereof are described herein.

Initially, webpages were generally static webpages, meaning that user interaction with an element on the webpage (e.g., clicking on a button) would result in sending information to the web server, which would render a new page, and the webpage would be reloaded and displayed at the browser with the new webpage. JavaScript then allowed client-side interactivity to be added to HTML webpages. Single-page applications became common, in which interactions between the web browser and the web server happened asynchronously without page reloads. For example, the Gmail® email web application provided by Google, LLC of Mountain View, Calif., can display an email inbox or email message on a webpage, allow the user to interact with the elements on the webpage, send and receive data asynchronously with the web server, and update one or more elements on the webpage without reloading the webpage. Many of these single-page applications involved rendering on the client side (e.g., on user device 340), such that user interactions resulted in asynchronous requests to the web server and returns of JSON (JavaScript Object Notation) objects used by the client to render an updated display.

Client-side rendering for single-page applications has some drawbacks, including that many web crawlers used by search engines for search engine optimization do not support client-side rendering when crawling websites. As such, these client-side rendered webpages are not subject to the benefits of search engine optimization. Additionally, client-side rendering generally involves using code at the web browser that is different from what is used on the web server.

In recent years, server-side JavaScript implementations have been introduced. Additionally, JavaScript frameworks have been introduced that use "isomorphic" JavaScript (sometimes referred to as "universal" JavaScript), which allow developers to create webpages that render on both the server side and the client side. Isomorphic JavaScript can allow for code re-use and consistency on both the server side and the client side and for interactive webpages to be indexed by search engine web crawlers, such that interactive webpages can be included in search engine optimization. For example, the React JavaScript framework, initially developed by Facebook, Inc., of Menlo Park, Calif., is an Isomorphic JavaScript framework.

In a conventional approach of loading an interactive webpage that uses isomorphic React on a web browser, the initial viewport of the webpage is first rendered, which can involve (i) downloading and processing the page HTML, (ii) downloading the CSS (Cascading Style Sheets) elements and/or font elements, (iii) downloading and evaluating the Redux data store (e.g., the data store for the React framework), and (iv) rendering the initial viewport portion of the page and downloading the associated images in this initial viewport portion of the page. The rendering of the initial viewport portion on the server side can be re-rendered on the client side, based on the isomorphic approach. The Redux data store that is downloaded to the web browser from the web server can be large. For example, for a search page, the Redux data store can be approximately 400 kilobytes (KB). The initial viewport portion can be the portion of the page that is initially viewable before the user scrolls down. This initial viewport portion is sometimes referred to as the "above the fold" portion. When the initial viewport portion of the webpage has been rendered on at least the client side, the user can see the user interface for the initial viewport portion of the webpage on the user device (e.g., user device 340), but the remainder of the page is not rendered, and none of the interactive elements on the page are functional yet, as the JavaScript files to power such functionality for interaction have not yet been downloaded.

After the initial viewport portion of the webpage has been rendered on at least the client side, the rest of the webpage and the interactive functionality for the webpage can be downloaded onto the user device. A JavaScript file that contains the React, Redux data store, and/or client renderer JSX (JavaScript XML, which is an extension to the JavaScript language used for the React framework) can be downloaded from the web server to the client device. This file can be large. For example, for a search page, the file can be approximately 3 megabytes (MB), which can take 10-15 seconds to download for a slow bandwidth connection, or 1.0-1.5 seconds for a basic high-speed 3G connection. The JavaScript in the file can be executed, and the React framework can re-render (e.g., reconcile) the DOM (Document Object Model), which is a tree structure that represents the content nodes of the user interface of the webpage. Images associated with the remainder of the user interface of the webpage below the initial viewport portion can then be downloaded onto the user device.

After the webpage has been fully loaded onto the user device and provides interactive functionality on the user device, a user can interact with elements of the webpage. When one of these interactions results in a state change, such as selecting to view the next page of search results, an asynchronous Ajax (Asynchronous JavaScript and XML) call can be made to the web server, which can get new JSON objects. The React framework can process the new JSON objects and update the user interface.

Conventional isomorphic React can involve inefficiencies in page load time and bandwidth overhead. For example, a search webpage can be accessed frequently by users of a website, so page performance can be a relevant factor. Like many modern webpages, the search webpage can use JavaScript to power its interactive functionality, such as handling user interface events, making an Ajax fetch to the web server, and updating the user interface, so the React framework is used to encapsulate the DOM access and the JavaScript function. For the server (e.g., web server) and client (e.g., web browser on the user device) to run on the same data store, the server passes the identical Redux state data store in HTML to the client side. This data store can be large, which can lead to waste in bandwidth, as the client side may not use all or even most of the data from the server side in the Redux data store. Additionally, React encapsulates the client-side logic, so the JavaScript-powered page interactivity will not start until React is fully loaded onto the user device. After the full page bundle, this can be greater than 1 MB of uncompressed data. Even after the React library is downloaded onto the user device, the web browser renders the elements and downloads additional images. For user interfaces with a small amount of DOM changes, foregoing React reconciliation and having the client side directly modify the DOM can save processing and/or bandwidth, especially when running the user interface on low-end mobile devices. With isomorphic React, both the web server and the client can render the user interface HTML, meaning that React presentation code is downloaded to the client side, which can add another 0.5 to 1 MB to the JavaScript file size.

React can perform complex webpage state management. Use of React can be justified by significant DOM operations, as React manages and minimizes the cost of these DOM operations. React provides this functionality at the expense of having a thick abstraction and bootstrapping cost.

Figure 5:
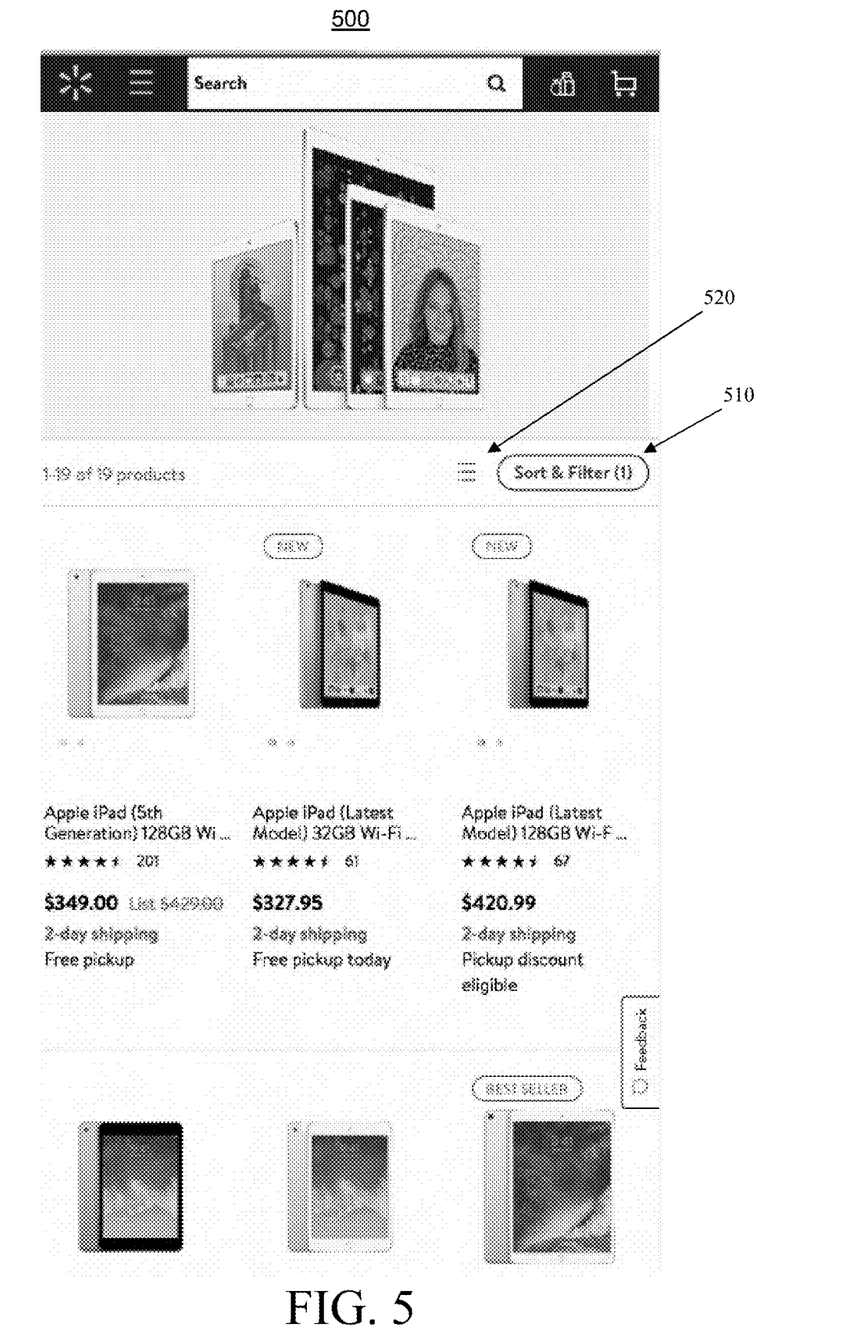
FIG. 5 shows an exemplary mobile webpage display for a search results page.
Figure 6:
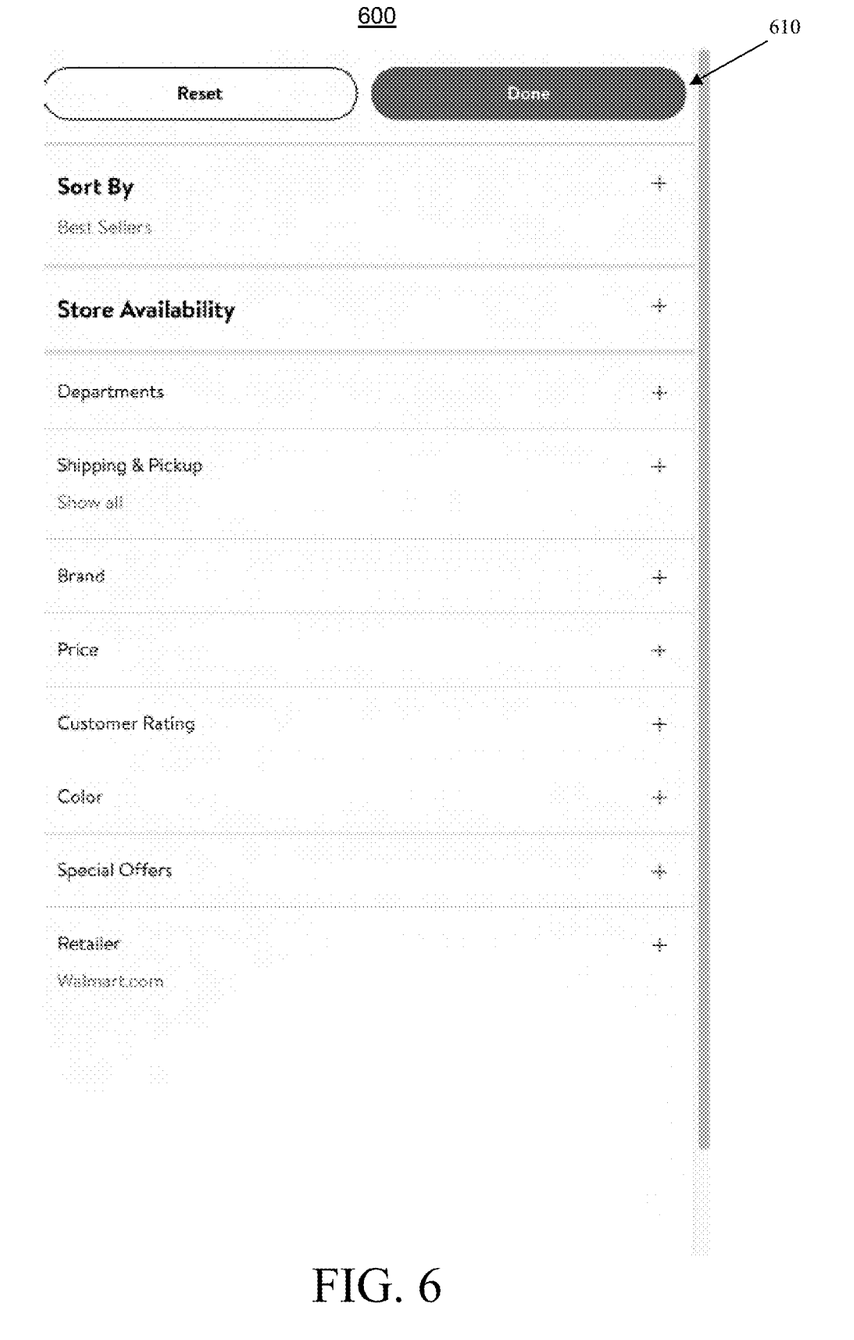
FIG. 6 shows an exemplary mobile webpage display for a sort and filter module, which can be displayed after selecting the Sort & Filter button on the mobile webpage display of FIG. 5.

A search webpage for mobile web interfaces is an example in which the emphasis can be on user interface display, initial viewport render speed, and user interaction ready time. FIG. 5 shows an exemplary mobile webpage display 500 for a search results page. When a webpage does not have a complex state to manage, the webpage can be implemented without React. In some webpages, certain features can operate better under the React approach. For example, the search webpage for mobile web interfaces can include certain features, such as a sort and filter module provided by selecting a "Sort & Filter" button 510, as shown in FIG. 5. Such features are often unused. For example, 3% of users can click on Sort & Filter button 510. When Sort & Filter button 510 is selected, a second screen can be displayed that allows a user to enter sorting and/or filtering options for the search results. FIG. 6 shows an exemplary mobile webpage display 600 for a sort and filter module, which can be displayed after selecting Sort & Filter button 510 (FIG. 5) on mobile webpage display 500 (FIG. 5). The sort and filter module shown in mobile webpage display 600 can be functionality that does not perform well (e.g., does not provide complex interactive functionality) without the React framework. Yet, because Sort & Filter button 510 (FIG. 5) is rarely selected in mobile webpage display 500 (FIG. 5), the sort and filter feature can be considered a non-core feature for the search webpage.

Returning to FIG. 3, in many embodiments, system 300 can be used to provide "hybrid" webpages. A hybrid webpage can include interactive user interface modules that are divided into two groups. A first group can be a frameworkless JavaScript group. Frameworkless JavaScript, which can also be referred to as "vanilla" JavaScript, refers to native JavaScript, which can be the basic, non-extended JavaScript. It is the plain JavaScript without any additional libraries like jQuery, etc. It does not include JavaScript frameworks, such as the React framework. In several embodiments, each group of interactive user interface modules can be processed differently.

In the first group of interactive user interface modules, the interactive user interface modules can be based on static HTML or involve light reliance on JavaScript, but not involve complex state change. For the first group of interactive user interface modules, the interactive user interface module can be rendered directly from the page HTML. The user interactivity for the first group of interactive user interface modules can be powered by frameworkless JavaScript. When a user clicks interacts with one of the first group of interactive user interface modules to cause a client-side refresh, such as clicking on page 2 of the search results list, for example, the web server can return HTML to update the DOM.

In the second group of interactive user interface modules, the interactive user interface modules can involve complex state change. For the second group of interactive user interface modules, the interactive user interface module can be rendered by the JavaScript framework, such as React JSX converting the Redux data store into HTML. The user interactivity for the second group of interactive user interface modules can be powered by a JavaScript framework, such as React. When a user clicks or interacts with one of the second group of interactive user interface modules to cause a client-side refresh, such as clicking on page 2 of the search results list, for example, the web server can return JSON objects, and the JavaScript framework, such as React, can update the DOM.

This hybrid approach of using first and second groups of interactive user interface modules can prioritize rendering and hydrating (e.g., populating with domain data) the frameworkless modules (i.e., the first group of interactive user interface modules) first, and subsequently (e.g., deferring or on-demand) rendering and hydrating the React modules (i.e., the second group of interactive user interface modules). A webpage can be made hybrid when its core features (e.g., features that are used by many or most of the users of the webpage) can be powered by frameworkless JavaScript, so that these core features are not delayed for the later React loading. If core features cannot be powered sufficiently by frameworkless JavaScript, the webpage can be provided using conventional isomorphic JavaScript (e.g., React framework).

When a webpage is deemed appropriate to convert to a hybrid approach, it can be converted by first identifying the list of user interface modules that can be made sufficiently interactive using frameworkless JavaScript (e.g., React). These modules can be categorized into the first group of interactive user interface modules. Next, the Redux data store can be abridged to remove data support for the modules in the first group of interactive user interface modules. If React modules can be defer-loaded, the corresponding data can be removed from the Redux data store. Next, the HTML for the first group of interactive user interface modules can be included in the initial page source that is sent for the initial viewport load. Next, a vanilla-page.bundle.js JavaScript file can be created, and the DOM manipulation and user event listening logic for the first group of modules can be rewritten therein in frameworkless JavaScript. This bundle can be loaded right after the initial page HTML is parsed.

Figure 4:
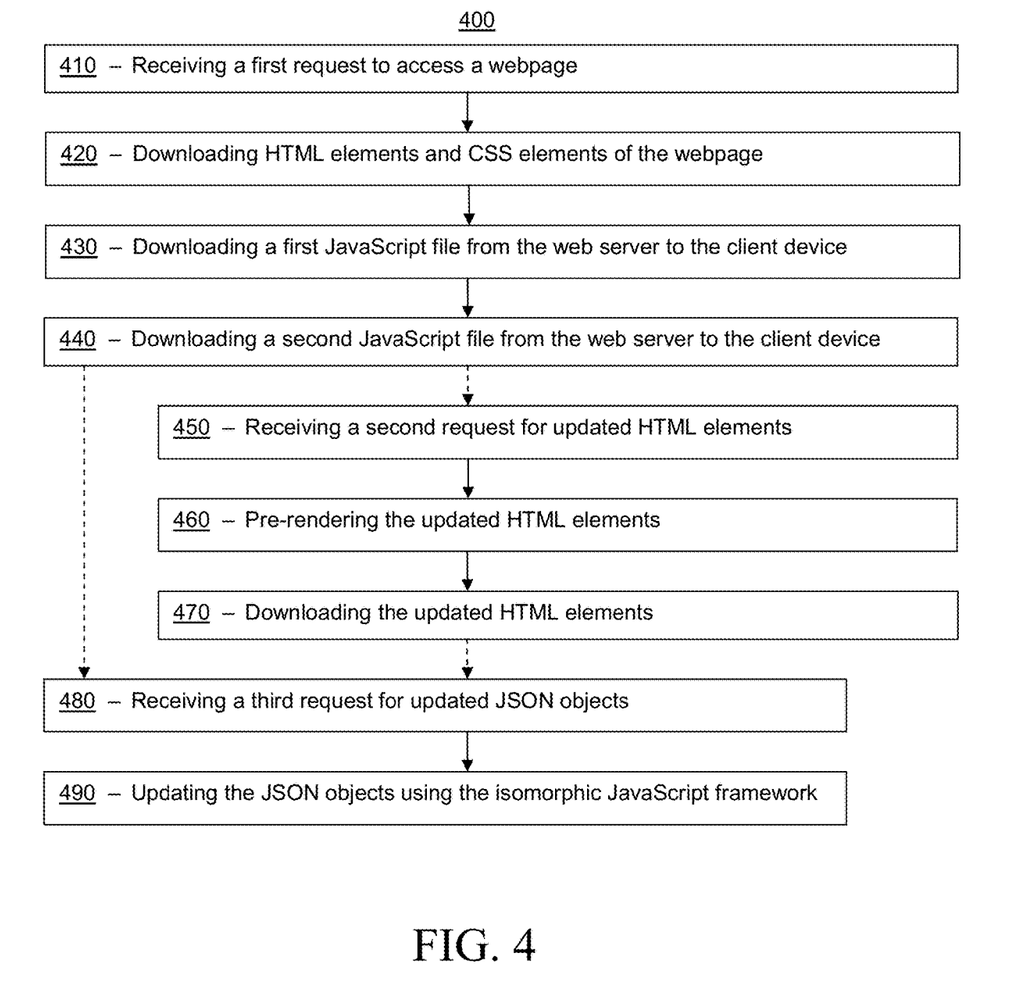
FIG. 4 illustrates a flow chart for a method, according to an embodiment.

Turning ahead in the drawings, FIG. 4 illustrates a flow chart for a method 400, according to an embodiment. In some embodiments, method 400 can be a method of providing hybrid interactivity in JavaScript webpage user interfaces. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of receiving, at a web server, a first request from a client device to access a webpage. The web server can be similar or identical to system 300 (FIG. 3). The client device can be similar or identical to user device 340 (FIG. 4). For example, the webpage can be a webpage of a website to browse and/or search for items (e.g., products), to add items to an electronic cart, and/or to purchase items, in addition to other suitable activities.

In several embodiments, method 400 also can include a block 420 of downloading HTML elements and CSS elements of the webpage from the web server to the client device such that a web browser of the client device renders visible page content associated with the HTML elements and the CSS elements of the webpage. The web browser can be similar or identical to web browser 341 (FIG. 3). In several embodiments, the initial download in this hybrid approach can result in rendering the user interface, and with the download of the first JavaScript file in block 430, can result in powering a majority of, and/or core features of, the user interface in the webpage. For example, the webpage HTML can be downloaded to the client device and processed. The CSS elements and/or fonts can be downloaded to the client device. The visible page content can be rendered, and the images can be downloaded onto the client device. The user interface can be displayed by the client device to the user (e.g., 350 (FIG. 3).

In a number of embodiments, method 400 additionally can include a block 430 of downloading a first JavaScript file from the web server to the client device such that a first group of interactive user interface modules of the webpage are rendered by the client device using the first JavaScript file. In many embodiments, the first group of interactive user interface modules can provide client-side interactive rendering of the webpage. In several embodiments, the first JavaScript file can be a frameworkless JavaScript file. In many embodiments, the first group of interactive user interface modules can include one or more carousel modules, which can be a CSS-based module that cycles through displays of content elements (e.g., products, etc.). In some embodiments, the first JavaScript file can power interactive functionality for the user interface for the first group of interactive user interface modules. In many embodiments, the first JavaScript file can be relatively small, such as less than 100 KB. Basic interactive functionality can be provided, such as check boxes, mouse hovers, changing between list view and grid view, carousel cycling, etc. In several embodiments, the webpage can be loaded onto the client device for most of the features, including all of the core features. For example, the search results page shown in mobile webpage display 500 of FIG. 5 can be powered by frameworkless JavaScript. When a user selects a tile view button 520, the display of the search results listed in mobile webpage display 500 can change from a grid view to a tile view. This interactive feature can be powered by frameworkless JavaScript. Some of the non-core features can be loaded later, such as next, deferred, or on-demand.

Returning to FIG. 4, in several embodiments, method 400 further can include a block 440 of downloading a second JavaScript file from the web server to the client device for a second group of interactive user interface modules. In many embodiments, the second JavaScript file can be a framework-based JavaScript file for an isomorphic JavaScript framework. In a number of embodiments, the second group of interactive user interface modules can be rendered at both the client device and the web server using the isomorphic JavaScript framework. For example, in some embodiments, the web server can pre-render, and the client device can render for display. In several embodiments, the isomorphic JavaScript framework can include a React JavaScript framework. In some embodiments, the second group of interactive user interface modules can include a filtering module, such as the sort and filter module shown in FIG. 6.

In several embodiments, the second JavaScript file can include the React, Redux data store, and/or client renderer JSX for the second group of user interfaces. This bundle is for a subset of user interfaces modules, so the bundle can be smaller than the React bundle would be in conventional isomorphic React. For example, instead of approximately 3 MB, the bundle can be approximately 1.5 MB. The other portions that were powered by React in conventional isomorphic React are now powered by frameworkless JavaScript. The JavaScript can be executed by the web browser, and the React framework can re-render (e.g., reconcile) the DOM tree. The React framework can fetch additional data using an asynchronous Ajax call on-demand. For example, if the user scrolls down, additional data can be loaded. In many embodiments, the second group of interactive user interface modules can be non-interactive on the webpage until block 440 is performed.

In some embodiments, the first JavaScript file can include a bridge element that provides communication of state change data from the second group of interactive user interface modules to the first group of interactive user interface modules. In several embodiments, the bridge element can include a global scope object, such as global event bus. In many embodiments, the communication of the state change data using the bridge element can be performed using a publish-subscribe messaging pattern.

For example, the search results page shown in mobile webpage display 500 of FIG. 5 can be powered by frameworkless JavaScript. When a user selects Sort & Filter button 510 in FIG. 5, the sort and filter module shown in mobile webpage display 600 of FIG. 6 can be displayed. The sort and filter module shown in mobile webpage display 600 of FIG. 6 can be powered by an isomorphic JavaScript framework, such as React. In many embodiments, the second JavaScript file can be downloaded to power the sort and filter module shown in mobile webpage display 600 of FIG. 6 after the frameworkless JavaScript is downloaded to power the interactivity in the search results page shown in mobile webpage display 500 of FIG. 5. In some embodiments, the second JavaScript file can be downloaded afterwards in the background before Sort & Filter button 510 (FIG. 5) is selected, or can be downloaded on-demand once Sort & Filter button 510 (FIG. 5) is selected by the user. The sorting and filtering functionality in the sort and filter module can involve complex state changes, which can be powered by the React module. In many embodiments, when the user selects a "Done" button 610 in the sort and filter module shown in mobile webpage display 600 of FIG. 6, the data for the state change can be communicated from the sort and filter module (which is part of the second group of interactive user interface modules) to the first group of interactive user interface modules, as provided in mobile webpage display 500 of FIG. 5, by using the bridge element. For example, when the users selects Done button 610 in FIG. 6 to apply new facets and/or sorting options selected by the user in mobile webpage display 600 of FIG. 6, the bridge element can perform an Ajax fetch for HTML from the web server to replace the interactive user interface modules in the first group of interactive user interface modules.

In a number of embodiments, method 400 additionally optionally can include blocks 450, 460, and/or 470, each of which can occur after block 440. Specifically, method 400 can include block 450 of receiving at the web server a second request for updated HTML elements for the webpage in response to a user of the client device interacting with the first group of interactive user interface modules to change a page state of the webpage. In several embodiments, the second request can be a user interacting with the first group of user interfaces of the webpage in a manner that changes the page state. For example, the user can interact with an interactive user interface module on the webpage to change the webpage from tile view to list view, or to view the page 2 items, in the search results webpage shown in mobile webpage display 500 of FIG. 5. In many embodiments, the second request can be an asynchronous call, such as an Ajax call to the web server to get new page HTML.

As noted above, method 400 further can include block 460, which can pre-rendering the updated HTML elements at the web server.

As also noted above, method 400 additionally can include block 470 of downloading the updated HTML elements from the web server to the client device to display the updated HTML elements on the webpage on the client device. In several embodiments, the DOM tree can be updated accordingly.

In several embodiments, after block 440 and after optional blocks 450, 460, and/or 470, method 400 further optionally can include blocks 480 and/or 490. Specifically, method 400 can include block 480 of receiving at the web server a third request for updated JSON objects for the webpage in response to a user of the client device interacting with the second group of interactive user interface modules to change a page state of the webpage. For example, the third request can be the user interacting with the second group of interactive user interface modules of the webpage in a manner that changes a page state of the webpage. For example, the React framework can request additional data from the web server by using an asynchronous Ajax call to the web server to get new and/or updated JSON objects for the webpage.

As noted above, method 400 additionally can include block 490 of updating the JSON objects using the isomorphic JavaScript framework at the web server and the client device. For example, the React framework can digest the new JSON at the web server and pre-render at the web server, and then re-render at the client device under the isomorphic framework.

Returning to FIG. 3, in several embodiments, communication system 301 can at least partially perform block 410 (FIG. 4) of receiving, at a web server, a first request from a client device to access a webpage.

In several embodiments, initial page load system 302 can at least partially perform block 420 (FIG. 4) of downloading HTML elements and CSS elements of the webpage from the web server to the client device such that a web browser of the client device renders visible page content associated with the HTML elements and the CSS elements of the webpage.

In a number of embodiments, frameworkless system 303 can at least partially perform block 430 (FIG. 4) of downloading a first JavaScript file from the web server to the client device such that a first group of interactive user interface modules of the webpage are rendered by the client device using the first JavaScript file.

In several embodiments, framework system 304 can at least partially perform block 440 (FIG. 4) of downloading a second JavaScript file from the web server to the client device for a second group of interactive user interface modules.

In a number of embodiments, update system 305 can at least partially perform block 450 (FIG. 4) of receiving at the web server a second request for updated HTML elements for the webpage in response to a user of the client device interacting with the first group of interactive user interface modules to change a page state of the webpage, block 460 (FIG. 4) of pre-rendering the updated HTML elements at the web server, block 470 (FIG. 4) of downloading the updated HTML elements from the web server to the client device to display the updated HTML elements on the webpage, block 480 (FIG. 4) of receiving at the web server a third request for updated JSON objects for the webpage in response to a user of the client device interacting with the second group of interactive user interface modules to change a page state of the webpage, and/or block 490 (FIG. 4) of updating the JSON objects using the isomorphic JavaScript framework at the web server and the client device.

In many embodiments, the techniques described herein can provide a practical application and several technological improvements. Specifically, the techniques described herein can provide for hybrid interactivity in JavaScript webpage user interfaces, which can reduce HTML page size and/or JavaScript file size to use less bandwidth and/or less processing. For example, the webpage HTML can be reduced by removing most of all of the Redux data store inline, which can decrease the amount of downloaded data by approximately 300 KB. The first and second JavaScript files in the hybrid approach can have a file size of approximately 100 KB and 1.5 MB, respectively, which can be much less than the JavaScript file size of 3 MB used in conventional isomorphic JavaScript with React. Additionally, the amount of time until the page is functionally interactive with the core features can be far less with the hybrid approach than with the conventional isomorphic JavaScript approach.

In a number of embodiments, the techniques described herein can solve a technical problem that arises within the realm of computer networks, as the performance issues with loading webpages with isomorphic JavaScript do not exist outside the realm of computer networks. Moreover, the techniques described herein can solve a technical problem that cannot be solved outside the context of computer networks. For example, the hybrid JavaScript approach cannot be performed without computer networks.

Although hybrid interactivity in JavaScript webpage user interfaces has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      receiving, at a web server, a first request from a client device to access a webpage;
      downloading HTML elements and CSS elements of the webpage from the web server to the client device such that a web browser of the client device renders visible page content associated with the HTML elements and the CSS elements of the webpage;
      downloading a first JavaScript file from the web server to the client device such that a first group of interactive user interface modules of the webpage are rendered by the client device using the first JavaScript file, the first group of interactive user interface modules providing client-side interactive rendering of the webpage, and the first JavaScript file being a frameworkless JavaScript file; and
      downloading a second JavaScript file from the web server to the client device for a second group of interactive user interface modules of the webpage, the second JavaScript file being a framework-based JavaScript file for an isomorphic JavaScript framework, and the second group of interactive user interface modules being rendered at both the client device and the web server using the isomorphic JavaScript framework;
   wherein:
      the first JavaScript file comprises a bridge element that provides communication of state change data from the second group of interactive user interface modules rendered using the isomorphic JavaScript framework to the first group of interactive user interface modules rendered using the frameworkless JavaScript file.

2. The system of claim 1, further comprising:
   receiving at the web server a second request for updated HTML elements for the webpage in response to a user of the client device interacting with the first group of interactive user interface modules to change a page state of the webpage;
   pre-rendering the updated HTML elements at the web server; and
   downloading the updated HTML elements from the web server to the client device to display the updated HTML elements on the webpage on the client device.

3. The system of claim 2, wherein the second request is an asynchronous call.

4. The system of claim 1, further comprising:
   receiving, at the web server, a third request for updated JSON objects for the webpage in response to a user of the client device interacting with the second group of interactive user interface modules to change a page state of the webpage; and
   updating the JSON objects using the isomorphic JavaScript framework at the web server and the client device.

5. The system of claim 1, wherein the bridge element comprises a global scope object.

6. The system of claim 1, wherein the communication of the state change data using the bridge element is performed using a publish-subscribe messaging pattern.

7. The system of claim 1, wherein the isomorphic JavaScript framework comprises a React JavaScript framework.

8. The system of claim 1, wherein the first group of interactive user interface modules comprise one or more carousel modules.

9. The system of claim 1, wherein the second group of interactive user interface modules comprise a filtering module.

10. The system of claim 1, wherein:
    the bridge element comprises a global scope object; and
    the communication of the state change data using the bridge element is performed using a publish-subscribe messaging pattern.

11. A method being implemented via execution of computing instructions configured to run at one or more processors and stored at one or more non-transitory computer-readable media, the method comprising:
    receiving, at a web server, a first request from a client device to access a webpage;
    downloading HTML elements and CSS elements of the webpage from the web server to the client device such that a web browser of the client device renders visible page content associated with the HTML elements and the CSS elements of the webpage;
    downloading a first JavaScript file from the web server to the client device such that a first group of interactive user interface modules of the webpage are rendered by the client device using the first JavaScript file, the first group of interactive user interface modules providing client-side interactive rendering of the webpage, and the first JavaScript file being a frameworkless JavaScript file; and downloading a second JavaScript file from the web server to the client device for a second group of interactive user interface modules of the webpage, the second JavaScript file being a framework-based JavaScript file for an isomorphic JavaScript framework, and the second group of interactive user interface modules being rendered at both the client device and the web server using the isomorphic JavaScript framework;

wherein:
the first JavaScript file comprises a bridge element that provides communication of state change data from the second group of interactive user interface modules rendered using the isomorphic JavaScript framework to the first group of interactive user interface modules rendered using the frameworkless JavaScript file.

12. The method of claim 11, further comprising:
receiving at the web server a second request for updated HTML elements for the webpage in response to a user of the client device interacting with the first group of interactive user interface modules to change a page state of the webpage;

pre-rendering the updated HTML elements at the web server; and downloading the updated HTML elements from the web server to the client device to display the updated HTML elements on the webpage on the client device.

13. The method of claim 12, wherein the second request is an asynchronous call.

14. The method of claim 11, further comprising:
receiving, at the web server, a third request for updated JSON objects for the webpage in response to a user of the client device interacting with the second group of interactive user interface modules to change a page state of the webpage; and updating the JSON objects using the isomorphic JavaScript framework at the web server and the client device.

15. The method of claim 11, wherein the bridge element comprises a global scope object.

16. The method of claim 11, wherein the communication of the state change data using the bridge element is performed using a publish-subscribe messaging pattern.

17. The method of claim 11, wherein the isomorphic JavaScript framework comprises a React JavaScript framework.

18. The method of claim 11, wherein the first group of interactive user interface modules comprise one or more carousel modules.

19. The method of claim 11, wherein the second group of interactive user interface modules comprise a filtering module.

20. The method of claim 11, wherein:
the bridge element comprises a global scope object; and
the communication of the state change data using the bridge element is performed using a publish-subscribe messaging pattern.

* * * * *